«12» United States Patent
Yuan et al.

(10) Patent No.: US 9,304,363 B2
(45) Date of Patent: Apr. 5, 2016

(54) ARRAY SUBSTRATE AND MANUFACTURING METHOD THEREOF, DISPLAY DEVICE

(71) Applicant: BEIJING BOE OPTOELECTRONICS TECHNOLOGY CO., LTD., Beijing (CN)

(72) Inventors: Hongliang Yuan, Beijing (CN); Wei Li, Beijing (CN); Huijie Xie, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 14/096,452

(22) Filed: Dec. 4, 2013

(65) Prior Publication Data
US 2014/0211143 A1 Jul. 31, 2014

(30) Foreign Application Priority Data

Jan. 25, 2013 (CN) .......................... 2013 1 0028769

(51) Int. Cl.
*G02F 1/1343* (2006.01)
*G02F 1/1337* (2006.01)

(52) U.S. Cl.
CPC .... *G02F 1/134309* (2013.01); *G02F 1/133707* (2013.01); *G02F 1/134363* (2013.01); *G02F 2001/134372* (2013.01)

(58) Field of Classification Search
CPC ............ G02F 1/133707; G02F 1/1343; G02F 1/134309; G02F 1/134363
See application file for complete search history.

(56) References Cited

U.S. PATENT DOCUMENTS

2009/0279034 A1\* 11/2009 Shoraku ............ G02F 1/133753
349/129

\* cited by examiner

*Primary Examiner* — Dung Nguyen
(74) *Attorney, Agent, or Firm* — Ladas & Parry LLP

(57) ABSTRACT

An array substrate has at least one array structure, the array structure having a first pixel unit, a second pixel unit and a third pixel unit arranged row-by-row; each of the first pixel unit and the third pixel unit has a single-domain inclining direction, and the second pixel unit has a plurality of domain inclining directions; the single-domain inclining direction of the first pixel unit is different from that of the third pixel unit; the domain inclining direction of the second pixel unit, at a side adjacent to the first pixel unit, is the same as the single-domain inclining direction of the third pixel unit, and the domain inclining direction of the second pixel unit, at a side adjacent to the third pixel unit, is the same as the single-domain inclining direction of the first pixel unit.

16 Claims, 5 Drawing Sheets

US 9,304,363 B2

ARRAY SUBSTRATE AND MANUFACTURING METHOD THEREOF, DISPLAY DEVICE

CROSS REFERENCE TO RELATED APPLICATIONS

This application claims priority from Chinese National Application No. 201310028769.X filed on Jan. 25, 2013, the contents of which are incorporated herein by reference.

TECHNICAL FIELD

Embodiments of the present disclosure relate to an array substrate and a manufacturing method there of, and a display device.

BACKGROUND

With the development of liquid crystal display technology, the Fringe Field Switching (FFS) liquid crystal displays having higher aperture ratio and a wider viewing angle have become more and more popular. In order to improve the display performance, the current FFS liquid crystal displays usually adopt a single domain or double-domain structure pixel array structure.

FIG. 1 shows a traditional liquid crystal display adopting single domain structure pixels, and the pixel electrodes 11 of all pixel units are inclined in a same direction, and the liquid crystal molecules are aligned in the same direction after being applied with a voltage. The liquid crystal display of such pixel structure has a higher light transmittance, but its disadvantages include that the lower contrast ratio and chromatic aberration of the liquid crystal display. In the situation of inclined viewing angle, in particular, the contrast ratio of the display observed by the user is illustrated in FIG. 1b. It can be seen that the contrast ratio is relatively poorer and the viewing angle is not ideal especially when the user observes at the angle of 225° or 315°.

FIG. 2 shows another traditional liquid crystal display adopting double-domain structure pixels, and an upper half 211 and a lower half 212 of the pixel electrode 21 in each of the pixel units are in a symmetrical inclining structure. When being applied with a voltage, the liquid crystal molecules 22 in the upper half and the lower half regions have inclining angles in the directions opposite to each other, i.e., two different liquid crystal domains exist in a single pixel region. Compared with the single domain structure pixel structure as illustrated in FIG. 1a, the double-domain structure pixel structure has an improved contrast ratio, but the problem of non-ideal viewing angle under the situation of inclined viewing angle still exists.

SUMMARY

The embodiments of the present disclosure provide an array substrate and a manufacturing method thereof, and a display device, which can improve the viewing angle and the quality of the display device.

One aspect of the embodiments of the present disclosure provides an array substrate, which comprises at least one array structure. The array structure comprises a first pixel unit, a second pixel unit and a third pixel unit arranged row-by-row; each of the first pixel unit and the third pixel unit has a single-domain inclining direction, and the second pixel unit has a plurality of domain inclining directions; the single-domain inclining direction of the first pixel unit is different from that of the third pixel unit; the domain inclining direction of the second pixel unit, at a side adjacent to the first pixel unit, is the same as the single-domain inclining direction of the third pixel unit, and the domain inclining direction of the second pixel unit, at a side adjacent to the third pixel unit, is the same as the single-domain inclining direction of the first pixel unit.

Another aspect of the embodiments of the present disclosure provides a display device, comprising an aforementioned array substrate.

A further aspect of the embodiments of the present disclosure provides a method of manufacturing an array substrate, comprising: forming at least one array structure on a transparent substrate, wherein the array structure comprises a first pixel unit, a second pixel unit and a third pixel unit arranged row-by-row; each of the first pixel unit and the third pixel unit has a single-domain inclining direction, and the second pixel unit has a plurality of domain inclining directions; the single-domain inclining direction of the first pixel unit is different from that of the third pixel unit; the domain inclining direction of the second pixel unit, at a side adjacent to the first pixel unit, is the same as the single-domain inclining direction of the third pixel unit, and the domain inclining direction of the second pixel unit, at a side adjacent to the third pixel unit, is the same as the single-domain inclining direction of the first pixel unit; and forming a comb-like first electrode and a plane-like second electrode in each of the first to third pixel units, wherein the first electrode is inclinedly aligned for driving liquid crystal molecules to align according to a corresponding domain inclining direction.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to clearly illustrate the technical solutions in the embodiments of the disclosure or in the prior arts, the drawings of the embodiments will be briefly described in the following. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1A:
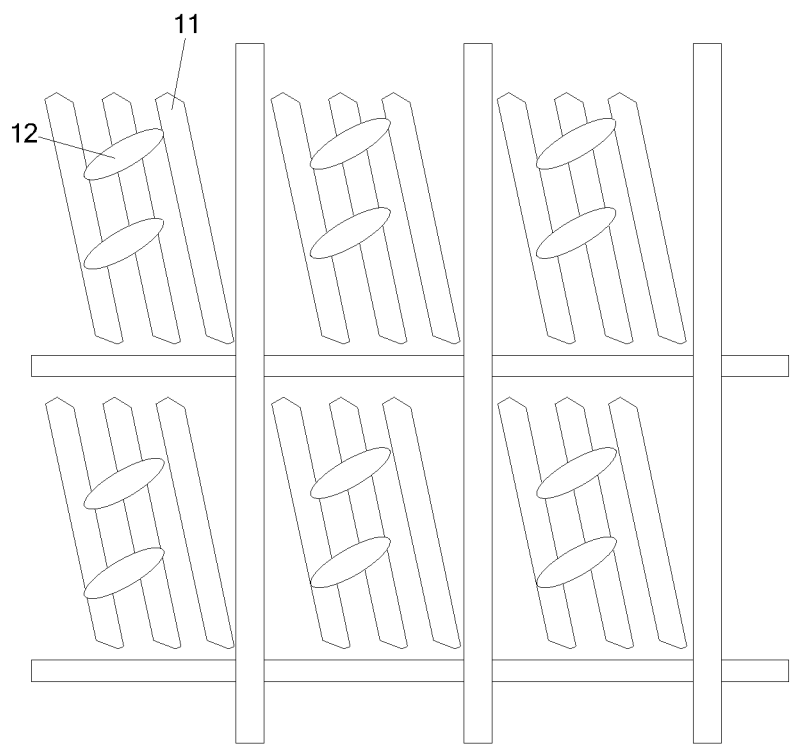
FIG. 1a is a schematic structural view of an array substrate of a traditional single domain structure liquid crystal display.
Figure 1B:
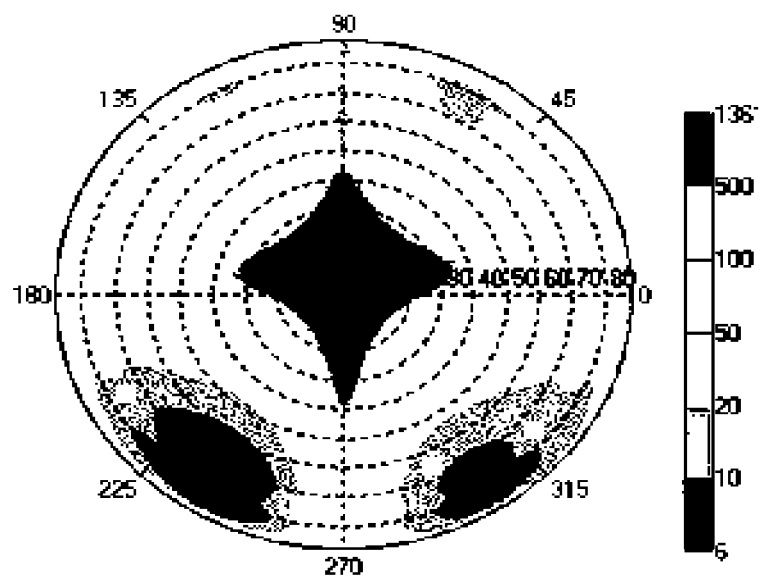
FIG. 1b is a simulation schematic view of the contrast ratio of the single domain structure liquid crystal display illustrated in FIG. 1a observed from different angles.
Figure 2:
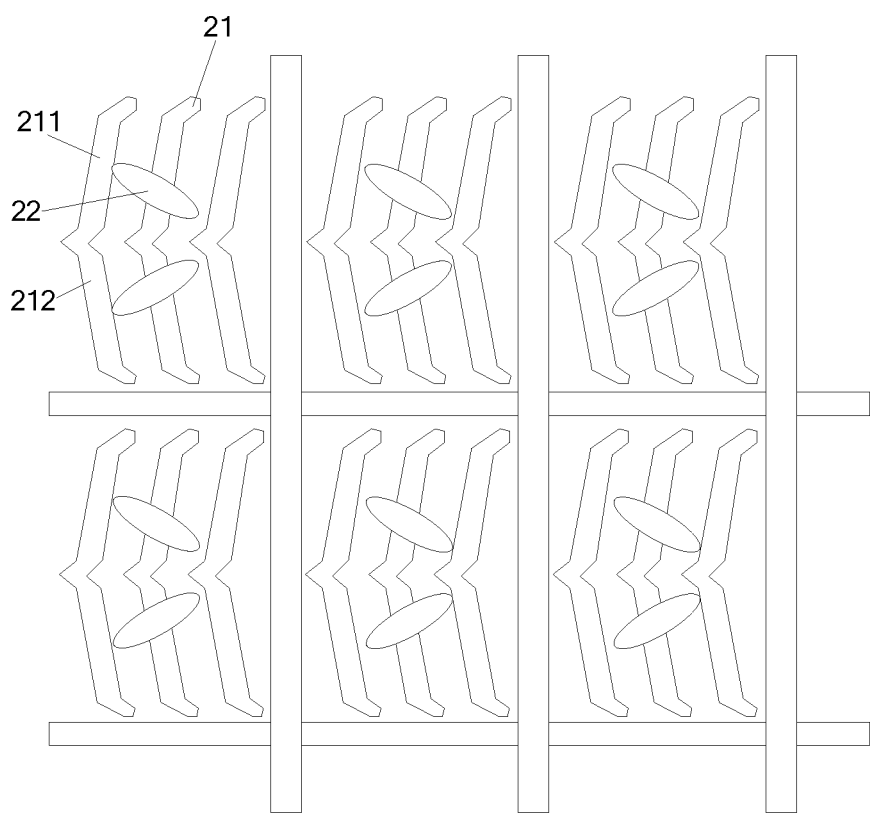
FIG. 2 is a schematic structural view of an array substrate of a traditional double-domain structure liquid crystal display.
Figure 3:
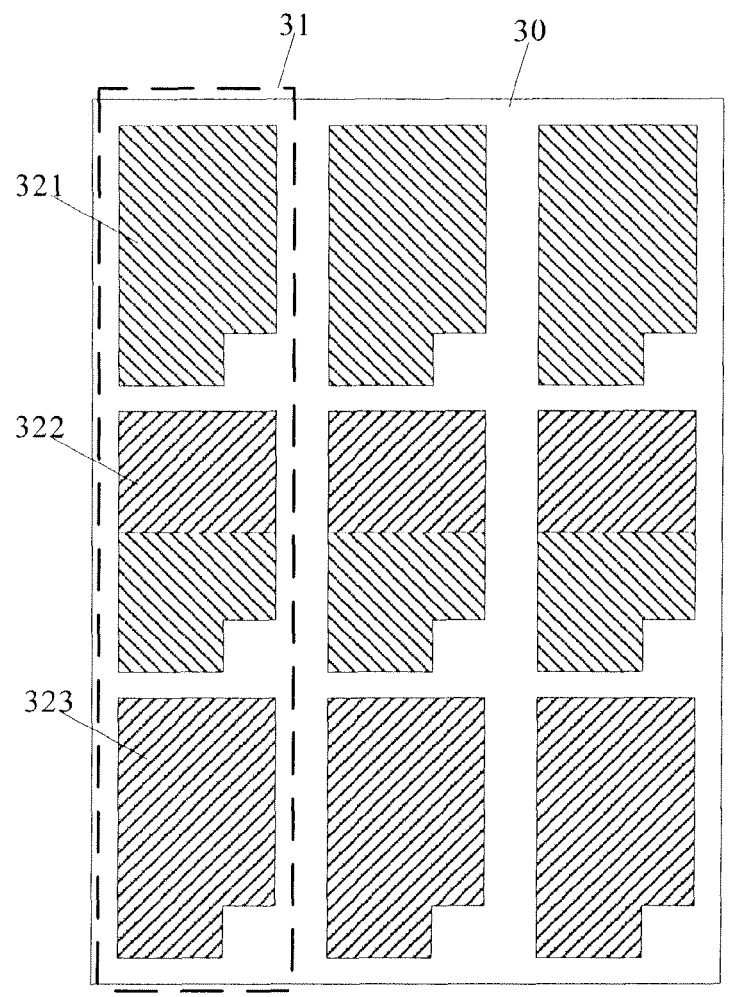
FIG. 3 is a schematic structural view of an array substrate provided by an embodiment of the present disclosure.

One embodiment of the present disclosure provides an array substrate 30, as illustrated in FIG. 3, comprising at least one array structure 31.

The array structure 31 comprises a first pixel unit 321, a second pixel unit 322 and a third pixel unit 323 arranged row-by-row. The term "row" in this disclosure is not limited to the horizontal direction or the vertical direction.

The first pixel unit 321 and the third pixel unit 323 each have a single-domain inclining direction, and the second pixel unit 322 has a plurality of domain inclining directions (more than one domain inclining direction). The first pixel unit 321 has a domain inclining direction different from that of the third pixel unit 323. The second pixel unit 322 has a domain inclining direction the same as that of the third pixel unit 323 at the side adjacent to the first pixel unit 321, and has a domain inclining direction same to that of the first pixel unit 321 at the side adjacent to the third pixel unit 323.

In the present embodiment, the domain inclining directions inside the array structure 31 may be symmetrical. For example, as illustrated in FIG. 3, the domain inclining directions of the first pixel unit 321 and the third pixel unit 323 may be symmetrical about a horizontal median line "a" of the second pixel unit 322 between the first and the third pixel units 321, 323, and the domain inclining directions of the second pixel unit 322 are symmetrical about the horizontal median line "a" as well. In this way, the domain inclining direction inside the array structure 31 as a whole is symmetrical about the horizontal median line "a."

The array substrate provided by the embodiment of the present disclosure comprises at least one array structure, and the array structure comprises a first pixel unit, a second pixel unit and a third pixel unit arranged row-by-row. Each of the first pixel unit and the third pixel unit has a single-domain inclining direction symmetrical to each other, and the second pixel unit has a plurality of domain inclining directions (multi-domain inclining direction). When the array substrate with such a structure is energized (applied with a voltage), the liquid crystal molecules will be inclinedly aligned under the action of the formed electric field, and this alignment has no phase difference when viewed from different directions, whereby the viewing angle and the quality of the display device can be improved.

What needs to be explained is that the viewing angle in the embodiments of the present disclosure means an observing angle when the contrast ratio is greater than 10. Both the single domain and the multiple domain structure mean the structure of pixel array. The single-domain inclining direction means that the liquid crystal molecules when applied with a voltage are inclinedly aligned in a single direction, and the multi-domain inclining direction means that the liquid crystal molecules when applied with a voltage are inclinedly aligned in many different directions. As illustrated in FIG. 3, the inclining directions of the oblique lines in the pattern filing regions represent different domain inclining directions in the array substrate provided in the embodiment of the present disclosure.

The embodiment of the present disclosure is illustrated by taking the example that the second pixel unit adopts a double-domain structure. As illustrated in FIG. 3, the liquid crystal molecules in the second pixel unit are inclinedly aligned in two different directions after being applied with a voltage. It can be understood that the double-domain structure of the second pixel unit is only an example but not limitation to the disclosure. The second pixel unit may also adopt a structure having three or more domains in order to improve the viewing angle of the display device.

For example, the second pixel unit may comprise three parts: an upper part, a middle part, and a lower part. The upper and the lower parts each may be of a single domain structure, has a domain inclining direction the same as that of the third pixel unit, at the side adjacent to the first pixel unit, and has a domain inclining direction same as that of the first pixel unit at the side at a side adjacent to the third pixel unit. The middle part may be of a complete double-domain structure. The domain inclining directions of the double-domain structure are different from the domain inclining directions of the two single domain structures. Such a four-domain structure can also improve the viewing angle of the display device.

Figure 4:
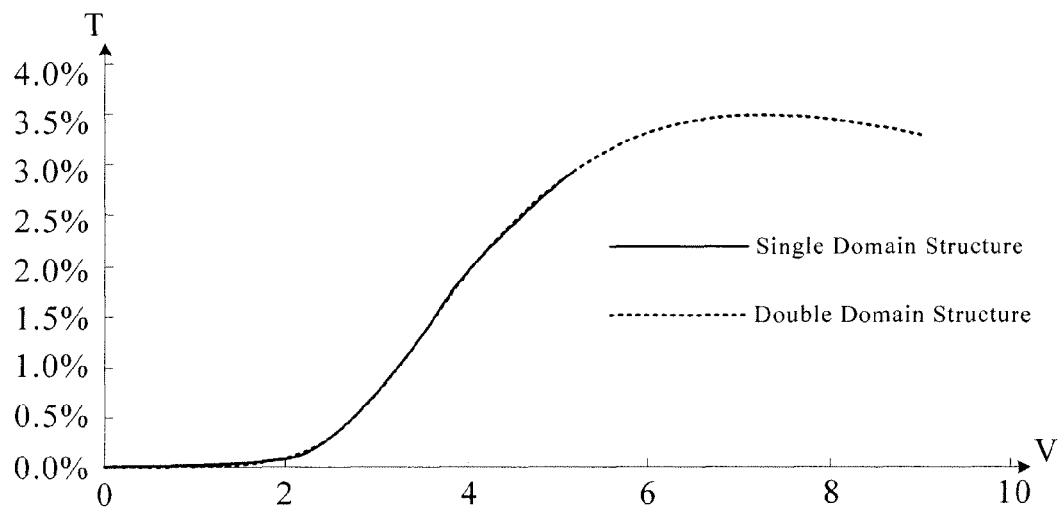
FIG. 4 is a schematic comparison chart of the V-T curve of the single domain structure display device and the double-domain structure display device according to the embodiment of the present disclosure.

Taking the double-domain structure for example, after the corresponding liquid crystal layer is applied a voltage; the V-T (voltage-transmittance) curves of the single domain structure and the double-domain structure are illustrated in FIG. 4. It can be seen clearly that the transmittance curves of the single domain structure and the double-domain structure change along with the change of voltages so that they are substantially consistent with each other, so the array substrate with such a structure will not produce visual inconsistence due to different transmittances. On the other hand, the aperture ratio of the single domain structure shall be same as that of the double-domain structure, thereby preventing the occurrence of such undesirable phenomena as visual differences and push Mura caused by the different structures of neighboring pixel units, and further improving the quality of the product.

The array substrate provided by the embodiment of the present disclosure can be widely applied to Fringe Field Switching (FFS) type liquid crystal display or Advance-Super Dimensional Switching (AD-SDS) type liquid crystal display. Both the common electrode and the pixel electrode in a pixel of the ADS-type liquid crystal display and the FFS type liquid crystal display may be disposed on the array substrate. The FFS technology generates fringe electric field between the pixel electrode and the common electrode in a same plane and makes the liquid crystal molecules aligned between the electrodes and right above the electrodes in the plane direction to switch, so as to improve the light transmittance of the liquid crystal layer. The ADS technology forms a multi-dimensional electric field with the parallel electric field at the fringe of the pixel electrodes in a same plane and the longitudinal electric field between the pixel electrode layer and the common electrode layer and makes all the liquid crystal molecules aligned between the pixel electrodes and right above the electrodes in the liquid crystal cell to deflect for switching, so as to improve the working efficiency of the plane alignment type liquid crystal and to increase the light transmittance.

Figure 5:
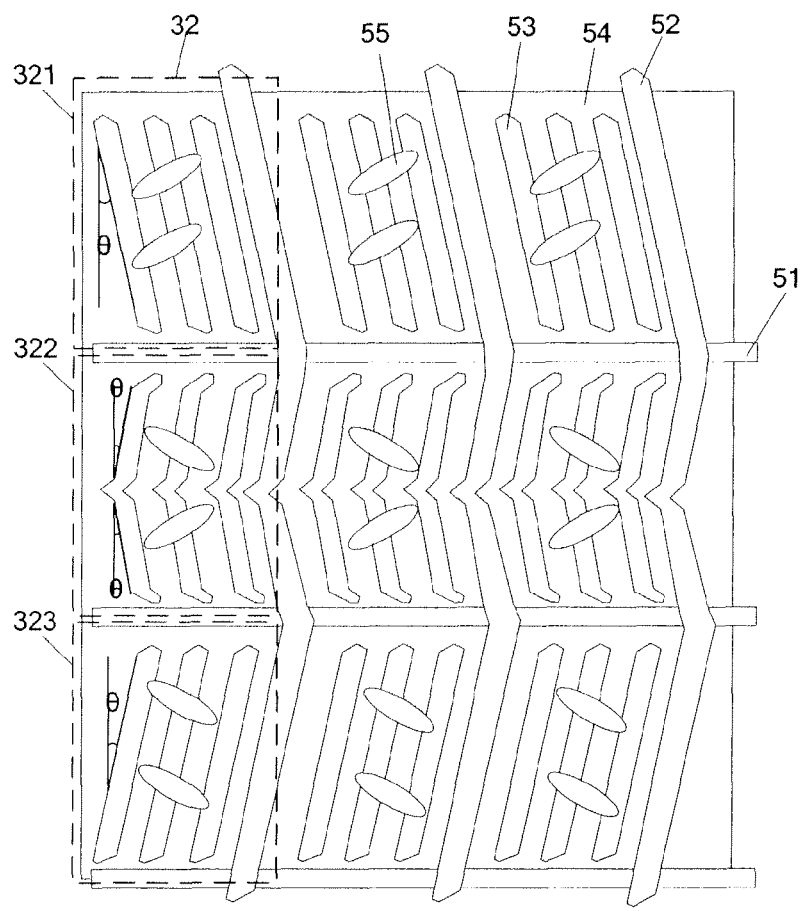
FIG. 5 is a schematic structural view of another array substrate provided by an embodiment of the present disclosure.

Furthermore, in one example illustrated in FIG. 5, the pixel units 32 are defined by gate lines 51 and data lines 52 intersecting each other.

Each of the pixel units 32 comprises an upper first electrode 53 that is comb-like and a lower second electrode 54 that is plane-like. The first electrode 53 is inclinedly aligned for driving the liquid crystal molecules 55 to align along a domain inclining direction.

Furthermore, in order to obtain the liquid crystal domain inclining direction in each pixel unit of the array structure illustrated in FIG. 3, the first electrode 53 in the first pixel unit 321 may be inclined rightwards by a predetermined angle θ, the first electrode 53 in the third pixel unit 323 may be inclined leftwards by a predetermined angle θ, the part of the first electrode 53 in the second pixel unit 322 at the side adjacent to the first pixel unit 321 may be inclined leftwards by a predetermined angle θ, and the part of the first electrode 53 in the second pixel unit 322 at the side adjacent to the third pixel unit 323 may be inclined rightwards by a predetermined angle θ.

In the embodiments of the present disclosure, the predetermined angle θ may be selected from the range between 5° and 7°. For example, when the predetermined angle θ is 5°, the liquid crystal molecules may be aligned in the direction as illustrated in FIG. 5 under the action of a formed electric field when the array substrate with such a structure is applied with a voltage, and this alignment has no phase difference when viewed from different directions, whereby the viewing angle and the quality of the display device can be improved.

Furthermore, the data lines 52 at the two sides of each pixel unit may have an inclining angle the same as that of the first electrode 53 in the pixel unit. As illustrated in FIG. 5, since the first electrode 53 in the first pixel unit 321 is inclined rightwards by a predetermined angle θ and the first electrode 53 in the third pixel unit 323 is inclined leftwards by a predetermined angle θ, the data lines 52 at the two sides of the first pixel unit 321 and the third pixel unit 323 may also be inclined rightwards or leftwards by a corresponding angle θ. Since the part of the first electrode 53 adjacent to the side of the first pixel unit 321 is inclined leftwards by a predetermined angle θ and the part of the first electrode 53 adjacent to the side of the third pixel unit 323 is inclined rightwards by a predetermined angle θ in the second pixel unit 322, the data lines 52 at the two sides of the second pixel unit 322 may be divided into two connected parts, which have different inclining angles corresponding to the two including directions of the first electrode 53. Because the data lines and the corresponding first electrode are always parallel to each other in different regions, the area occupied by the data lines can be reduced and the aperture ratio of the display device can be effectively improved.

In the embodiment of the present disclosure, the first electrode 53 may be a pixel electrode and the second electrode 54 may be a common electrode; or the first electrode 53 may be a common electrode and the second electrode 54 may be pixel electrode.

Software may be utilized to simulate the contrast ratio of the array substrate observed from different viewing angles provided by the embodiment of the present disclosure, and the result is illustrated in the following Table 1:

TABLE 1

| φ/° | θ = 0° | θ = 45° |
|---|---|---|
| 0 | 1040.27 | 95.90 |
| 45 | 1040.27 | 23.59 |
| 90 | 1040.27 | 877.96 |
| 135 | 1040.27 | 24.37 |
| 180 | 1040.27 | 106.73 |
| 225 | 1040.27 | 43.90 |
| 270 | 1040.27 | 949.33 |
| 315 | 1040.27 | 41.24 |

The viewing angles of the liquid crystal display are represented in spherical coordinates, wherein φ is an elevation angle, θ is an azimuth, θ=0° represents viewing from a direction perpendicular to the surface of the display, and θ=45° represents viewing from a direction at an angle of 45° with respect to the surface of the display. It can be seen from the simulation results that, when the elevation angle are of different values, the contrast ratio of the display from either front or oblique viewing angle satisfies the requirements of normal viewing.

Figure 6:
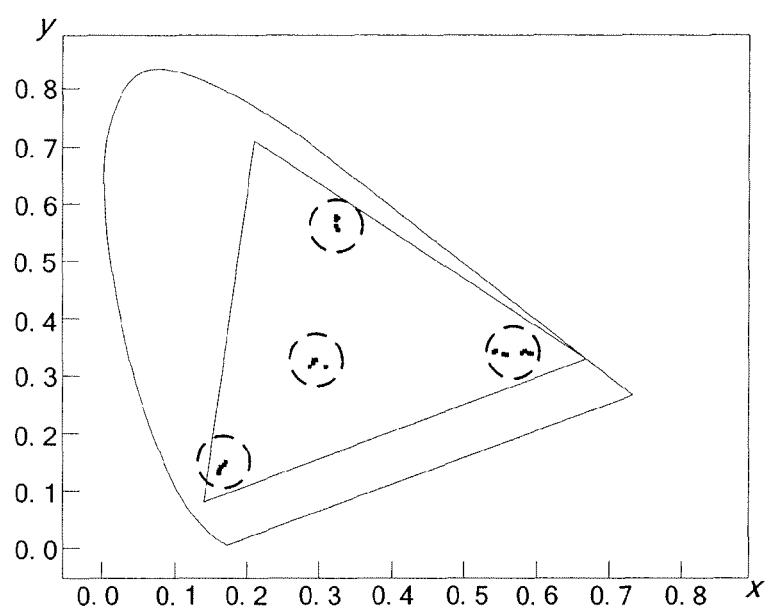
FIG. 6 is a simulation schematic view of chromatic aberration of an array substrate provided by the embodiment of the present disclosure at different angles.

On the other hand, software may be utilized to simulate the chromaticity of the array substrate observed from different viewing angles provided by the embodiment of the present disclosure. As illustrated in FIG. 6, an area defined by each dotted circle represents the chromatic aberration of the array substrate at a viewing angle. It can be seen that the chromatic aberration is small no matter at which angle the display is viewed. The array substrate provided by the embodiment of the present disclosure can effectively reduce the chromatic aberration of the display device while improving the viewing angle of the display device, whereby the quality of the display device can be further improved.

Figure 7:
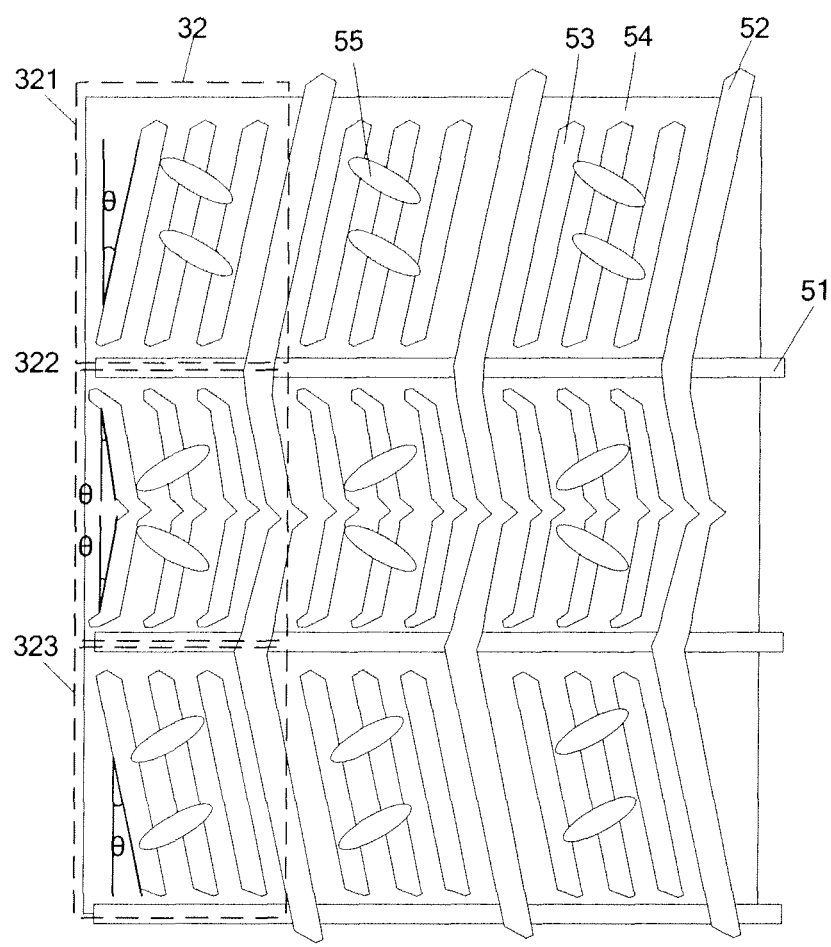
FIG. 7 is a schematic structural view of a further array substrate provided by an embodiment of the present disclosure.

FIG. 7 shows another array substrate provided by an embodiment of the present disclosure. The array substrate comprises a plurality of pixel units, and the first electrode 53 in the first pixel unit 321 is inclined leftwards by a predetermined angle θ, the first electrode 53 in the third pixel unit 323 is inclined rightwards by a predetermined angle θ, the part of the first electrode 53 in the second pixel unit 322 at the side adjacent to the first pixel unit 321 is inclined rightwards by a predetermined angle θ, and the part of the first electrode 53 in the second pixel unit 322 at the side adjacent to the third pixel unit 323 is inclined leftwards by a predetermined angle θ.

Similar to the aforementioned embodiment, the predetermined angle θ may be selected from the range between 5° and 7°. The data lines 52 at two sides of each pixel unit may have an inclining angle same as that of the first electrode 53 in the pixel unit. The first electrode 53 may be a pixel electrode and the second electrode 54 may be a common electrode; or the first electrode 53 may be a common electrode and the second electrode 54 may be pixel electrode.

The array substrate with such a structure has a domain inclining direction completely opposite to that of the aforementioned embodiment. When being applied with a voltage, the liquid crystal molecules may also be inclinedly aligned under the action of a formed electric field, and this alignment has no phase difference when viewed from different directions, whereby the viewing angle and the quality of the display device can be improved.

An embodiment of the present disclosure provides a display device, which comprises any of the aforementioned array substrates. The display device may be an FFS type liquid crystal display or an ADS type liquid crystal display. The display device may be a liquid crystal display, a liquid crystal television, a digital photo frame, a mobile phone, a tablet PC, and other products or components having display function.

The display device provided by the embodiment of the present disclosure comprises an array substrate, and the array substrate comprises at least one array structure. The array structure comprises a first pixel unit, a second pixel unit and a third pixel unit arranged row-by-row, and each of the first pixel unit and the third pixel unit has a single-domain inclining direction symmetrical to each other, and the second pixel unit has a plurality of domain inclining directions. When the array substrate with such a structure is applied with a voltage, the liquid crystal molecules will be inclinedly aligned under the action of a formed electric field, and this alignment has no phase difference when viewed from different directions, whereby the viewing angle and the quality of the display device can be improved.

A further embodiment of the present disclosure provides a method of manufacturing an array substrate, the method comprising the following processes.

S801. forming at least one array structure on a transparent substrate.

The array structure to be formed comprises a first pixel unit, a second pixel unit and a third pixel unit arranged row-by-row; the pixel units are defined by gate lines and data lines intersecting each other.

S802. forming a comb-like first electrode and a plane-like second electrode in each of the first to third pixel units.

The first electrode in each pixel unit is inclinedly aligned for driving the liquid crystal molecules to align along a domain inclining direction. Each of the first pixel unit and the third pixel unit has a single-domain inclining direction, and the second pixel unit has a plurality of domain inclining directions; the single-domain inclining direction of the first pixel unit is different from that of the third pixel unit; the domain inclining direction of the second pixel unit, at a side adjacent to the first pixel unit, is the same as the single-domain inclining direction of the third pixel unit, and the domain inclining direction of the second pixel unit, at a side adjacent to the third pixel unit, is the same as the single-domain inclining direction of the first pixel unit.

The embodiment of the present disclosure provides a method of manufacturing an array substrate comprising at least one array structure, which comprises a first pixel unit, a second pixel unit and a third pixel unit arranged row-by-row, and each of the first pixel unit and the third pixel unit has a single-domain inclining direction symmetrical to each other, and the second pixel unit has a plurality of domain inclining directions. When the array substrate with such a structure is applied with a voltage, the liquid crystal molecules will be inclinedly aligned under the action of a formed electric field, which alignment has no phase difference when viewed from different directions, whereby the viewing angle and the quality of the display device can be improved.

Furthermore, the first electrode in the first pixel unit is inclined rightwards by a predetermined angle, the first electrode in the third pixel unit is inclined leftwards by a predetermined angle, a part of the first electrode in the second pixel unit at a side adjacent to the first pixel unit is inclined leftwards by a predetermined angle, and a part of the first electrode in the second pixel unit at a side adjacent to the third pixel unit is inclined rightwards by a predetermined angle.

Or, the first electrode in the first pixel unit is inclined leftwards by a predetermined angle, the first electrode in the third pixel unit is inclined rightwards by a predetermined angle, a part of the first electrode in the second pixel unit at a side adjacent to the first pixel unit is inclined rightwards by a predetermined angle, and a part of the first electrode in the second pixel unit at a side adjacent to the third pixel unit is inclined leftwards by a predetermined angle.

For example, the predetermined angle is within the range between 5° and 7°.

Furthermore, the data lines at the two sides of each pixel unit may have an inclining angle same as that of the first electrode in the pixel unit. Because the data lines and the corresponding first electrode are always parallel to each other in different regions, the area occupied by the data lines can be reduced and the aperture ratio of the display device can be effectively improved.

In the embodiment of the present disclosure, the first electrode may be a pixel electrode and the second electrode may be a common electrode; or the first electrode may be a common electrode and the second electrode may be pixel electrode. The domain inclining directions inside the array structure are symmetrical.

The above embodiments of the present disclosure are given by way of illustration only and thus are not limitative of the protection scope of the present disclosure, which is determined by the attached claims.

What is claimed is that:

1. An array substrate, comprising at least one array structure, wherein the array structure comprises a first pixel unit, a second pixel unit and a third pixel unit arranged row-by-row;
   each of the first pixel unit and the third pixel unit has a single-domain inclining direction, and the second pixel unit has a plurality of domain inclining directions;
   the single-domain inclining direction of the first pixel unit is different from that of the third pixel unit;
   the domain inclining direction of the second pixel unit, at a side adjacent to the first pixel unit, is the same as the single-domain inclining direction of the third pixel unit, and the domain inclining direction of the second pixel unit, at a side adjacent to the third pixel unit, is the same as the single-domain inclining direction of the first pixel unit.

2. The array substrate according to claim 1, wherein the first to third pixel units are defined by gate lines and data lines intersecting each other;
   each of the first to third pixel units comprises a comb-like first electrode and a plane-like second electrode; and the first electrode is inclinedly aligned for driving liquid crystal molecules to align according to a corresponding domain inclining direction.

3. The array substrate according to claim 2, wherein the second pixel unit is of a double-domain structure.

4. The array substrate according to claim 3, wherein the first electrode in the first pixel unit is inclined rightwards by a predetermined angle, the first electrode in the third pixel unit is inclined leftwards by a predetermined angle, a part of the first electrode in the second pixel unit at a side adjacent to the first pixel unit is inclined leftwards by a predetermined angle, and a part of the first electrode in the second pixel unit at a side adjacent to the third pixel unit is inclined rightwards by a predetermined angle; or,
   the first electrode in the first pixel unit is inclined leftwards by a predetermined angle, the first electrode in the third pixel unit is inclined rightwards by a predetermined angle, a part of the first electrode in the second pixel unit at a side adjacent to the first pixel unit is inclined rightwards by a predetermined angle, and a part of the first electrode in the second pixel unit at a side adjacent to the third pixel unit is inclined leftwards by a predetermined angle.

5. The array substrate according to claim 4, wherein the predetermined angle is within the range between 5° and 7°.

6. The array substrate according to claim 4, wherein the data lines at two sides of each pixel unit have an inclining angle same as that of the first electrode in the pixel unit.

7. The array substrate according to claim 1, wherein the first electrode is a pixel electrode and the second electrode is a common electrode; or the first electrode is a common electrode and the second electrode is a pixel electrode.

8. The array substrate according to claim 1, wherein the domain inclining directions inside the array structure are symmetrical.

9. A display device, comprising an array substrate according to claim 1.

10. A method of manufacturing an array substrate, comprising:
    forming at least one array structure on a transparent substrate, wherein the array structure comprises a first pixel unit, a second pixel unit and a third pixel unit arranged row-by-row; each of the first pixel unit and the third pixel unit has a single-domain inclining direction, and the second pixel unit has a plurality of domain inclining directions; the single-domain inclining direction of the first pixel unit is different from that of the third pixel unit; the domain inclining direction of the second pixel unit, at a side adjacent to the first pixel unit, is the same as the single-domain inclining direction of the third pixel unit, and the domain inclining direction of the second pixel unit, at a side adjacent to the third pixel unit, is the same as the single-domain inclining direction of the first pixel unit; and forming a comb-like first electrode and a plane-like second electrode in each of the first to third pixel units, wherein the first electrode is inclinedly aligned for driving liquid crystal molecules to align according to a corresponding domain inclining direction.

11. The method according to claim 10, wherein the second pixel unit is of a double-domain structure.

12. The method according to claim 11, wherein the first electrode in the first pixel unit is inclined rightwards by a predetermined angle, the first electrode in the third pixel unit is inclined leftwards by a predetermined angle, a part of the first electrode in the second pixel unit at a side adjacent to the first pixel unit is inclined leftwards by a predetermined angle, and a part of the first electrode in the second pixel unit at a side adjacent to the third pixel unit is inclined rightwards by a predetermined angle; or, the first electrode in the first pixel unit is inclined leftwards by a predetermined angle, the first electrode in the third pixel unit is inclined rightwards by a predetermined angle, a part of the first electrode in the second pixel unit at a side adjacent to the first pixel unit is inclined rightwards by a predetermined angle, and a part of the first electrode in the second pixel unit at a side adjacent to the third pixel unit is inclined leftwards by a predetermined angle.

13. The method according to claim 12, wherein the predetermined angle is within the range between 5° and 7°.

14. The method according to claim 12, wherein data lines at two sides of each pixel unit have an inclining angle same as that of the first electrode in the pixel unit.

15. The method according to claim 10, wherein the first electrode is a pixel electrode and the second electrode is a common electrode; or the first electrode is a common electrode and the second electrode is pixel electrode.

16. The method according to claim 10, wherein the domain inclining directions inside the array structure are symmetrical.

* * * * *